United States Patent [19]

Le Devehat et al.

[11] Patent Number: 5,046,522
[45] Date of Patent: Sep. 10, 1991

[54] ROTARY ELBOW FLUID DISTRIBUTION/COLLECTION VALVE

[75] Inventors: Eugene Le Devehat, Saligny; Pierre Colle, Beaumont-Le-Roger, both of France

[73] Assignee: FMC Corporation, Chicago, Ill.

[21] Appl. No.: 561,554

[22] Filed: Aug. 2, 1990

[30] Foreign Application Priority Data

Aug. 2, 1989 [FR] France .................. 89 10442

[51] Int. Cl.⁵ .................. F16K 35/00; F16K 37/00; F16K 5/06
[52] U.S. Cl. .................. 137/385; 137/554; 137/625.11
[58] Field of Search .................. 137/554, 625.11, 385

[56] References Cited

U.S. PATENT DOCUMENTS

| | | | |
|---|---|---|---|
| 2,341,531 | 2/1944 | Dand | 137/625.11 |
| 2,506,534 | 5/1950 | Wolcott | 137/625.11 |
| 2,536,199 | 1/1951 | McDonald | 137/625.11 X |
| 2,556,668 | 6/1951 | Williams | 137/625.11 |
| 2,593,733 | 4/1952 | Davies | 137/625.11 |
| 2,821,998 | 2/1958 | Mayhew | 137/625.11 |
| 2,830,564 | 4/1958 | Bryant | 137/625.11 |
| 2,835,273 | 5/1958 | McDonald | 137/625.11 |
| 2,840,109 | 6/1958 | Wadleigh | 137/625.11 |
| 2,888,098 | 5/1959 | Florence | 137/625.11 X |
| 2,996,083 | 8/1961 | Huska | 137/625.11 |
| 3,067,478 | 2/1963 | Winders | 137/625.11 |
| 3,194,267 | 7/1965 | Lyon et al. | 137/625.11 |
| 3,674,123 | 7/1972 | Lewis et al. | 137/625.11 X |
| 3,896,855 | 7/1975 | Grieger et al. | 137/625.11 |
| 4,191,213 | 3/1980 | Dolling et al. | 137/625.11 X |
| 4,458,708 | 7/1984 | Leonard et al. | 137/625.11 X |
| 4,784,179 | 11/1988 | Carbenay | 137/625.11 X |

FOREIGN PATENT DOCUMENTS 3418325 11/1985 Fed. Rep. of Germany .
2505966 11/1982 France .
2539204 1/1983 France .

Primary Examiner—John Rivell
Attorney, Agent, or Firm—W. William Ritt, Jr.; Richard B. Megley

[57] ABSTRACT

A fluid transfer valve (1) adapted to be cleaned by scraping, comprising a main fluid transfer section (2), a plurality of secondary fluid transfer sections distributed angularly about the axis (X—X) of the main section and disposed at equal distances from and at equal inclinations to this axis, and a rotary tubular elbow (4) connected at one end (4A) by a rotary coupling (5) to the main section and adapted, depending on its angular position about the axis of the main section, to have its other end (4B) aligned with any selected one (3A) of the secondary sections. The main and secondary sections and the rotary elbow have identical inside diameters, and the rotary elbow is part of a rotatable pipe closure element (7) comprising a ring (8) coaxial with the rotary coupling (4) through which said other end (4B) of the rotary elbow discharges and which at all times is in fluid-tight contact with the radially innermost edges of the secondary sections so as to close off all said secondary sections except said one selected secondary section.

16 Claims, 4 Drawing Sheets

ROTARY ELBOW FLUID DISTRIBUTION/COLLECTION VALVE

BACKGROUND OF THE INVENTION

This invention concerns valves adapted to be cleaned by scraping and more particularly to such valves adapted to place a fluid transfer pipe in communication with a selected one of a plurality of other fluid transfer pipes.

A valve according to this invention has utility especially but not exclusively, in the field of transferring liquids such as oil or other petroleum products between supply pipes, storage tanks and draw-off pipes terminating at loading/offloading arms, and other systems for loading road or rail tankers or devices for filling barrels. It may be necessary to connect a supply pipe to a selected one of a plurality of draw-off pipes; a selective fluid distribution valve is used for this purpose.

If the same pipe is used to distribute several liquids in succession a known cleaning process entails shutting of the supply of the first liquid in the pipe on the upstream side and, before opening the supply of the next liquid, also on the upstream side of the pipe, passing a scraper, commonly termed a pig, through the valve from the upstream end to the downstream end and vice versa, the scraper being adapted to scrape clean the inside wall of the pipe so as to remove residues of the first liquid adhering to that wall.

In order to carry out this procedure it is necessary for the pipe and the various valves mounted on it to have the same inside diameter everywhere with no radii of curvature too small to prevent passage of the scraper.

A selective distribution valve adapted to be cleaned by scraping in this way is described in French patent number 2,222,587. This valve or distributor comprises a right-angle elbow section connected at one end to a fixed pipe section through a pivoting articulation or rotary coupling, and at its other end to a junction valve comprising a sliding bushing adapted to be threaded over the end of a selected one of a plurality of draw-off sections distributed angularly in a plane transverse to the fixed pipe section.

SUMMARY OF THE INVENTION

This invention is directed to alleviating the disadvantages of the type of distributor (or collector) valve of that French patent while retaining its advantages. This invention is directed in particular to ensuring at all times fluid-tight closure of the draw-off pipe sections to which the fixed pipe section is not connected. This invention is also directed to enabling accurate and easily automated positioning of the elbow in alignment with the selected draw-off section, and to then establishing the connection in a simple and effective manner, with minimum operator intervention, and all this with a valve structure that is simple, rigid and economical, the number of moving parts in the valve being minimized.

To this end this invention proposes a fluid transfer valve, adapted to be cleaned by scraping, comprising a main fluid transfer pipe section, a plurality of secondary pipe sections distributed angularly about the axis of the main section and disposed at equal distances from and at equal inclinations to this axis, and a rotary tubular elbow connected at one end by a rotary coupling to the main pipe section and adapted, depending on its angular position about the axis of the main section, to have its other end aligned with any selected one of the secondary pipe sections. The main and secondary pipe sections and the rotary elbow have identical inside diameters, and the rotary elbow is part of an annular rotatable pipe closure element that is coaxial with the rotary coupling through which said other end of the rotary elbow discharges, and that is at all times in fluid-tight contact with the adjacent edges of the secondary pipe sections so as to close off all the secondary sections other than the one selected secondary section.

In the preferred embodiments of the invention:

the secondary pipe sections are coplanar and regularly spaced in an angular direction about the axis of the main section;

the rotatable pipe closure element is surrounded by a housing by means of which the main and secondary pipe sections are attached to each other;

the rotatable pipe closure element has a radially outermost surface which is part-spherical with its centre at the intersection of the axes of the main and secondary pipe sections, the radially innermost edges of the secondary pipe sections being likewise situated on a part-spherical surface of substantially the same radius;

the radius of the rotatable pipe closure element is between three and five times the inside radius of the main and secondary pipe sections;

the radius of the rotatable pipe closure element is between one and one and one-half times the average radius of curvature of the rotary elbow;

the rotatable pipe closure element is rotated by a rotary motor coaxial with the main pipe section and in line therewith beyond the elbow;

the rotary motor can be powered by hydraulic, electric or pneumatic means;

the rotatable pipe closure element comprises a plurality of locking members the number of which is equal to the number of secondary pipe sections, and the housing includes a locking member that cooperates with locking ports on the rotatable pipe closure element, one port at each angular position at which the rotary elbow is aligned with one of the secondary pipe sections;

the locking member preferably is a retractable pin and the locking ports on the rotatable pipe closure element are adapted to receive said pin;

the rotatable pipe closure element includes a marker that cooperates with a plurality of detectors, each associated with a secondary pipe section, to sense when the end of the rotary elbow is aligned with the selected secondary pipe section;

the marker is a protuberance and the detectors are proximity sensors.

The invention also comprises a second plurality of secondary pipe sections distributed angularly around the axis of the main pipe section and disposed at equal distances from and with equal inclinations to this axis, and a second rotatable pipe closure element with a second rotary elbow of which one end is connected by a second rotary coupling to the elbow of the main pipe section and of which the other end is adapted to be aligned with any chosen one of the secondary pipe sections of this second plurality thereof. The second rotatable pipe closure element is disposed in a second housing by means of which the pipe sections of the second plurality are fastened to the main section.

A valve according to this invention may be used to connect selectively a single supply pipe to a plurality of draw-off pipes or to connect a chosen one of a plurality of supply pipes to the same draw-off pipe. Two such valves may be connected back-to-back to connect a selected one of a plurality of supply pipes to a selected one of a plurality of draw-off pipes, thereby comprising a double collection/distribution valve.

Other objects, characteristics and advantages of the invention will become apparent from the following description given by way of non-limiting example with reference to the appended drawings.

DESCRIPTION OF THE PREFERRED EMBODIMENT

Figure 1:
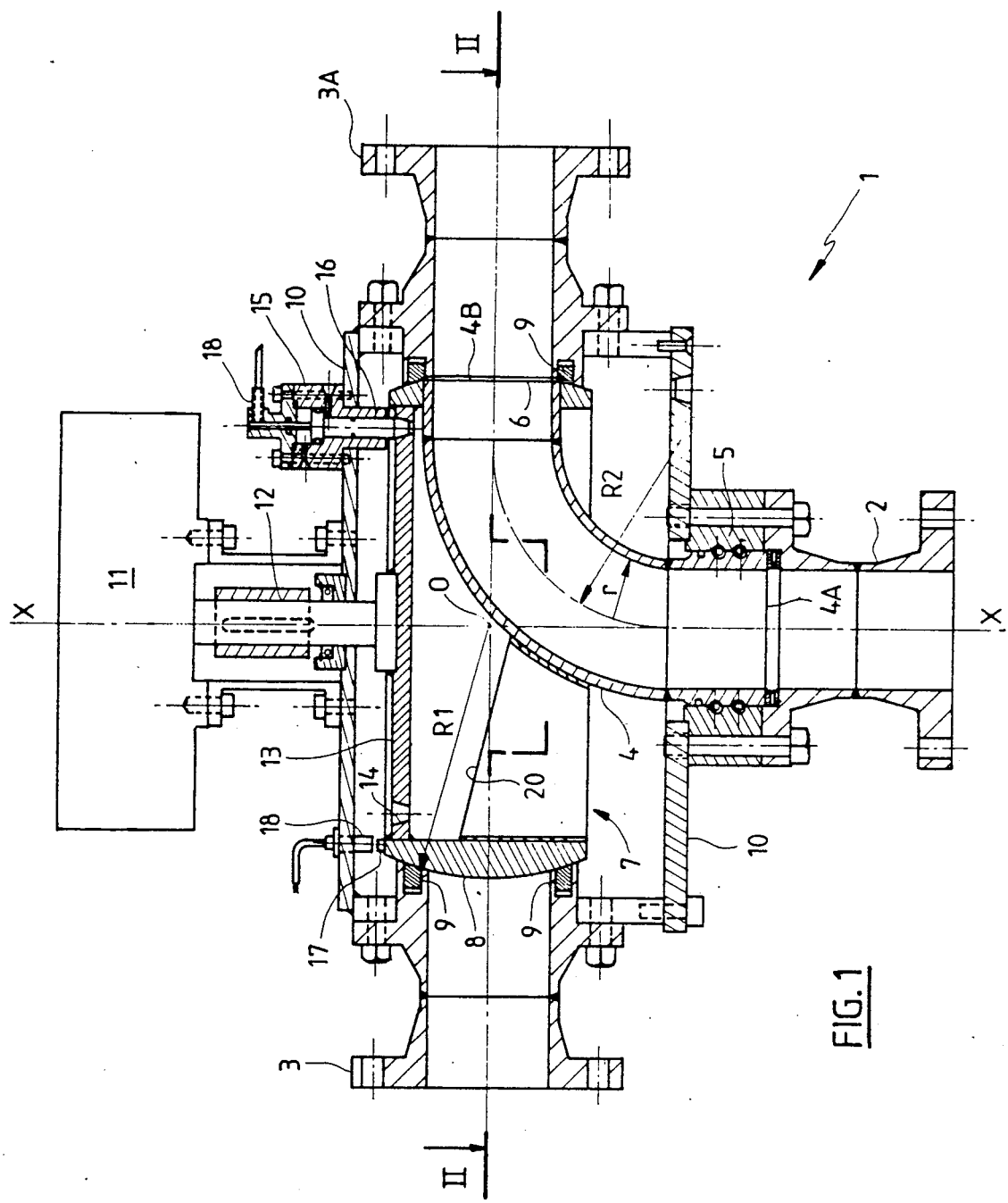
FIG. 1 is a central vertical section, on the line I—I in FIG. 2, of a rotary elbow valve in accordance with the invention.
Figure 2:
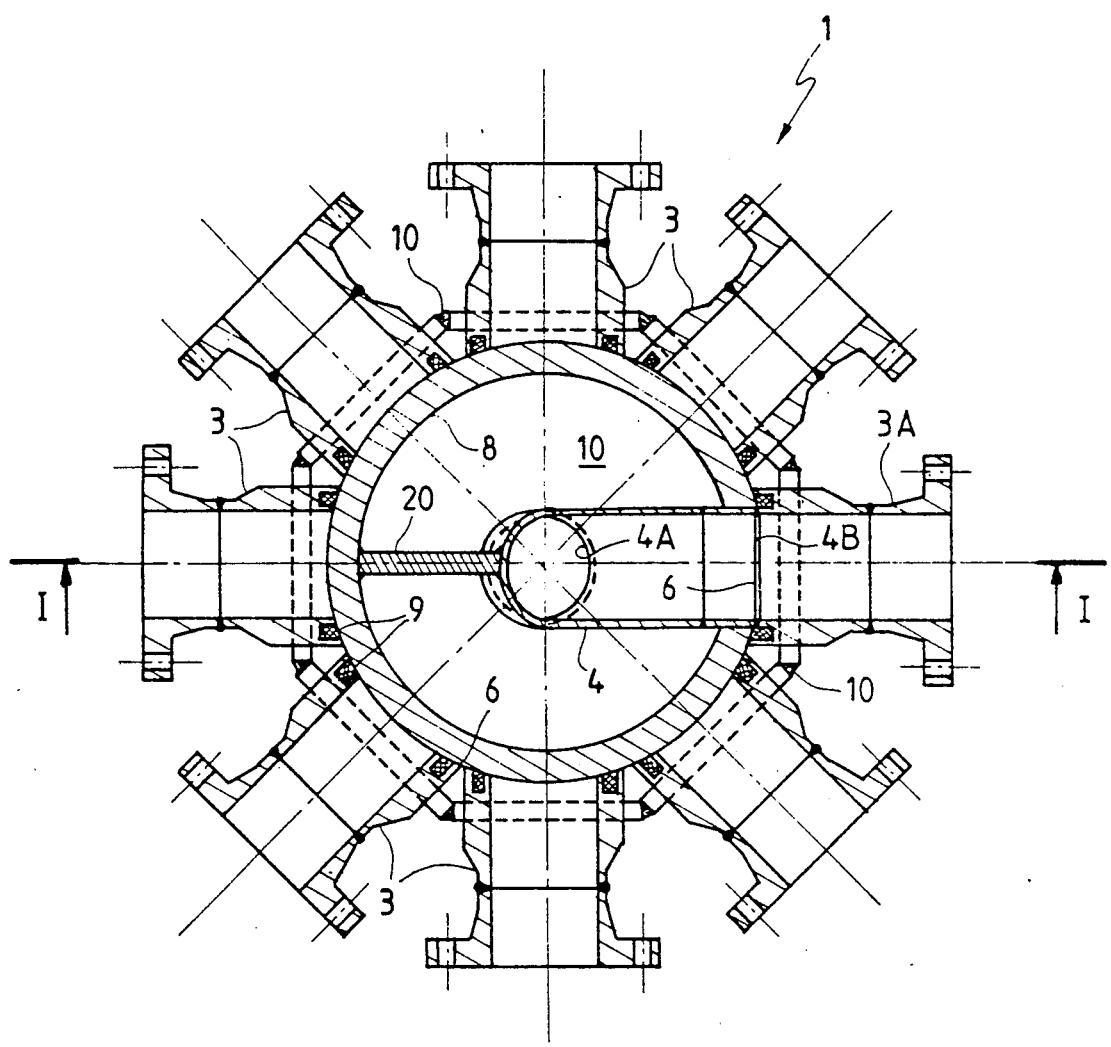
FIG. 2 is a view of this valve in transverse cross-section on the line II—II in FIG. 1.

FIGS. 1 and 2 show a fluid transfer valve 1 adapted to be cleaned by scraping and comprising a main pipe section 2 and a plurality of secondary pipe sections 3 distributed angularly about the axis X—X of the main pipe section; a rotary elbow 4 is connected at one end 4A to the main pipe section through a rotary pipe coupling 5.

The radially innermost edges 6 of the secondary pipe sections are at the same distance from, and at the same inclination to, the axis X—X. These secondary pipe sections have coplanar axes and their edges are disposed on a circle.

Depending on the angular position of the rotary elbow 4, its end 4B may be aligned with any chosen one, such as 3A, of the secondary pipe sections 3.

The rotary elbow 4 forms part of a rigid rotatable pipe closure element 7 comprising a ring 8 coaxial with the main pipe section 2 and through which discharges the end 4B of the rotary elbow.

At all times the ring 8 is in fluid-tight contact with the innermost edges 6 of the secondary pipe sections 3 so that it shuts off the secondary sections that are not in communication with the rotary elbow. Seals 9 are provided on the innermost edges 6 so that shutting off the secondary pipe sections or their connection to the rotary elbow is always fluid-tight.

It should be understood that the ring 8 cooperates with the set of innermost edges 6 to constitute a rotational guide for the pipe closure element 7. The resulting bearing effect is reinforced by the fact that the ring 8 and the edges 6 meet on a spherical surface centered at the intersection 0 of the axes of the pipe sections 2 and 3.

The radius R1 of the ring 8 is approximately three to five times the inside radius r of the main and secondary pipe sections 2 and 3, and is also between one and one and one-half times the average radius of curvature R2 of the elbow 4.

The pipe closure element 7 is disposed inside a closed housing 10 by means of which the main and secondary pipe sections 2 and 3 are fastened to each other.

The pipe closure element 7 is rotated by a rotary motor 22 coaxial with the main pipe section 2 and aligned with the latter beyond the pipe closure element 7. The motor can be powered by hydraulic, electric or pneumatic means, and comprises a shaft 12 fixed to a transverse plate 13 fastened to the ring 8.

The plate 13 has a plurality of circumferentially spaced ports equal in number to the number of secondary pipe sections 3 (eight in this instance). On the housing 10 is a latch 15 with a pneumatically operated retractable pin 16 adapted to be axially aligned with one of the ports 14 when the end 4B of the elbow is correctly aligned with one of the pipe sections 3. As an alternative, these ports 14 could be located on any other part of the pipe closure element 7, such as the ring for example.

Also provided on the pipe closure element 7 is a marker 17 in the form of a protuberance that is sensed by any of a plurality of circumferentially spaced proximity sensors 18 each of which is associated with a respective one of the secondary pipe sections 3. The protuberance is diametrically opposite the end 4B of the elbow 4.

A stiffening gusset 20 extends between the ring 8 and the rotary elbow 4.

It will be realized that this valve is easy to automate: the motor 22 is activated until the marker 17 is sensed by the sensor 18 associated with the chosen pipe section 3, whereupon the motor is deactivated and the pin 16 of the latch 15 is inserted in the adjacent port 14 to lock the pipe closure element 7 against further rotation.

Figure 3:
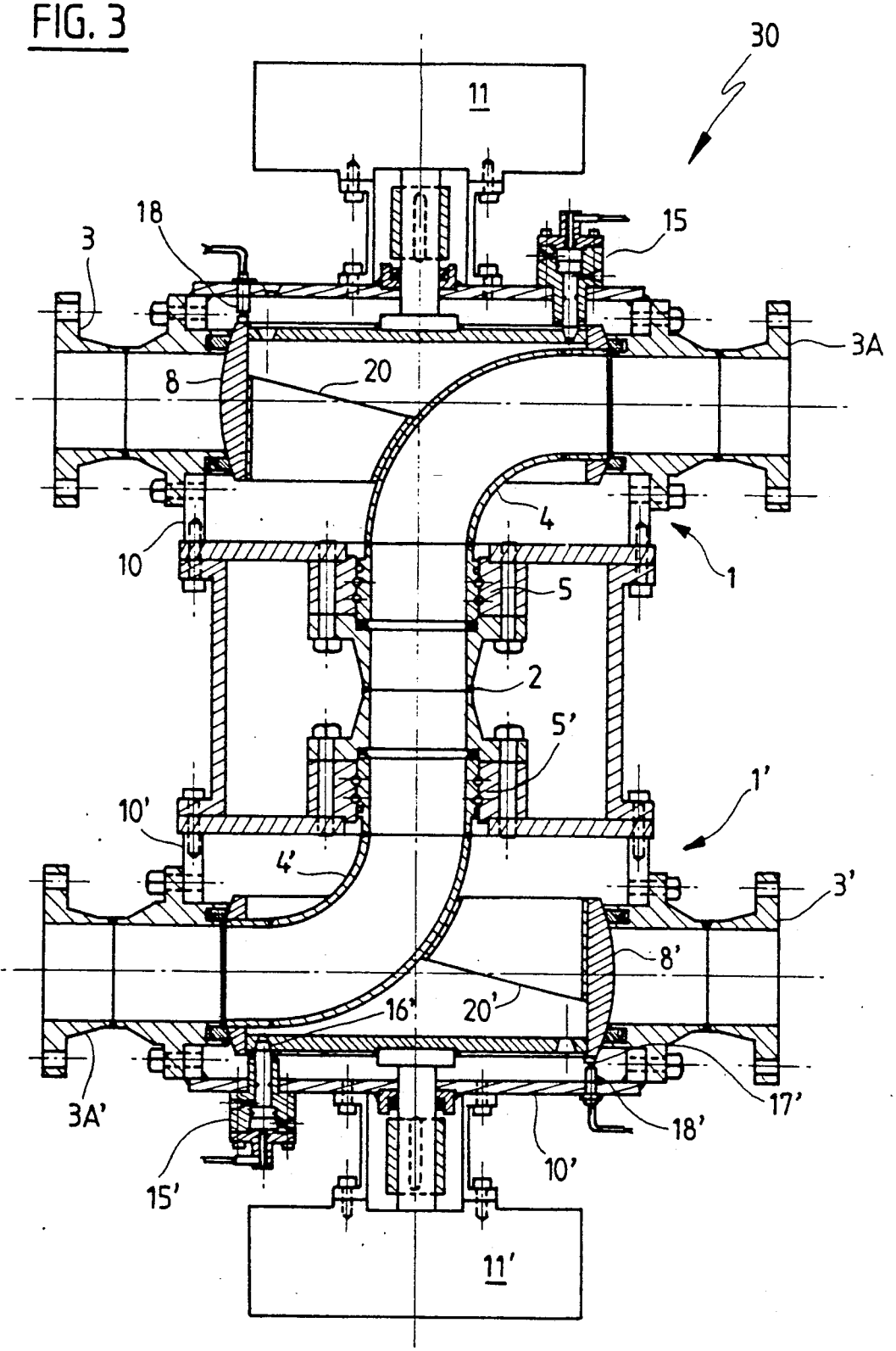
FIG. 3 is a double valve comprising two valves according to FIGS. 1 and 2, connected back-to-back.

FIG. 3 shows a double valve 30 obtained by adding to the valve 1 (FIGS. 1 and 2) a second valve 1' which is similar to it and which is fixed to it back-to-back with a common main pipe section. The component parts of this valve 1' have the same reference symbols as those of the valve 2, but with the addition of a prime ('). The housings 10 and 10' are fastened together.

Figure 4:
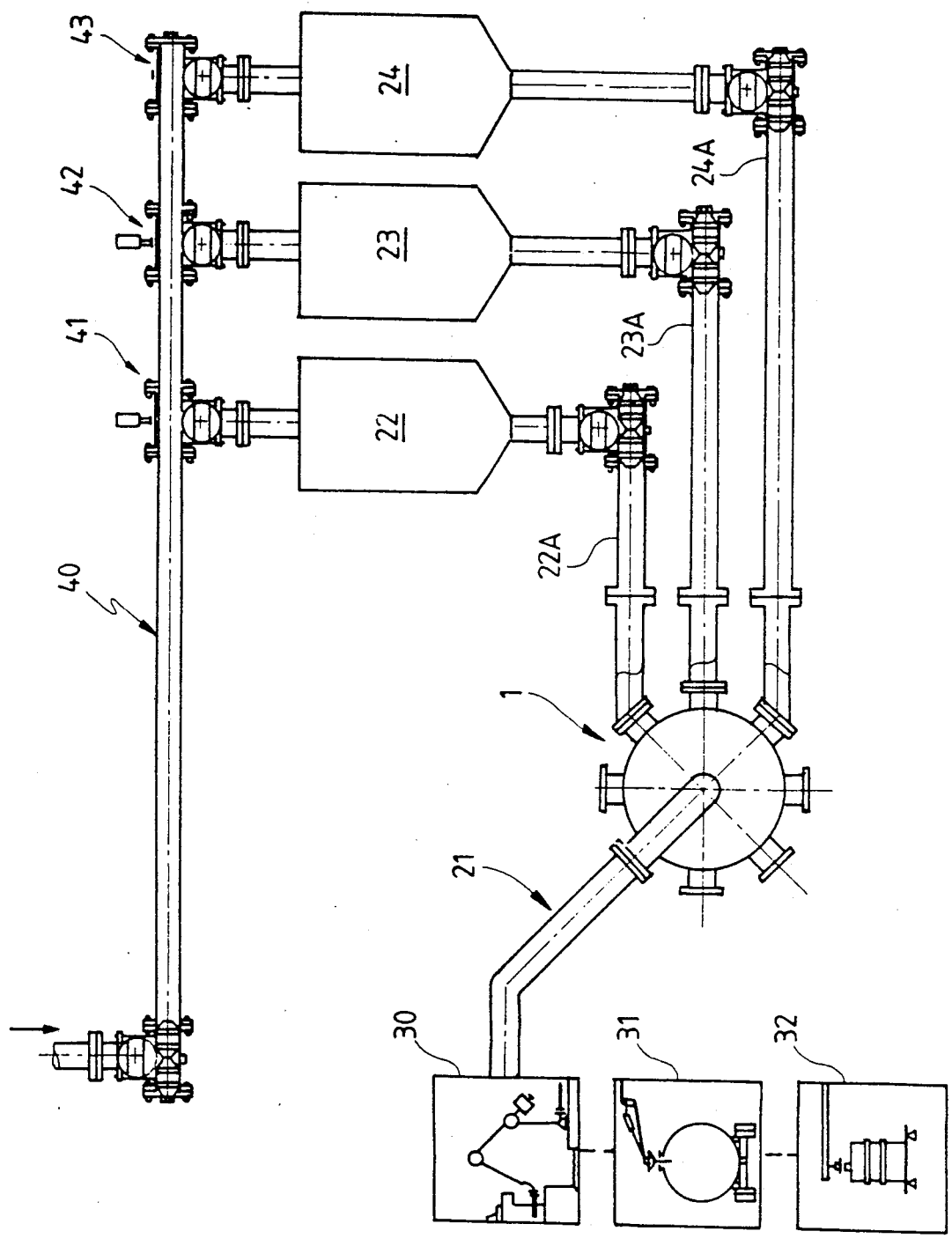
FIG. 4 is a fluid transfer circuit including a valve as shown in FIGS. 1 and 2.

FIG. 4 shows a typical installation using the valve 1 to transfer fluid through a pipe 21 connected to the valve's pipe section 2. The fluid is contained in storage tanks 22, 23, 24 connected by pipes 22A, 23A and 24A, respectively, to secondary pipe sections of the valve 1. The outlet pipe 21 may terminate at a marine loading-/offloading arm 30, a road tanker loading system 31, or a barrel loading system 32.

A pipe 40 is provided for filling the storage tanks 22, 23 and 24; as an alternative (not shown), all the valves 41, 42 and 43 connecting the pipe 40 to the storage tanks could be replaced by a valve of the kind shown in FIGS. 1 and 2.

Although the best mode contemplated for carrying out the present invention has been herein shown and described, it will be apparent that modification and variation may be made without departing from what is regarded to be the subject matter of the invention.

What is claimed is:

1. A fluid transfer valve (1) adapted to be cleaned by scraping, comprising a main fluid transfer section (2), a plurality of secondary fluid transfer sections distributed angularly about the axis (X—X) of the main section and disposed at equal distances from and at equal inclinations to said axis, and a rotary tubular elbow (4) connected at one end (4A) by a rotary coupling (5) to said main section and adapted, depending on its angular position about the axis of said main section, to have its other end (4B) aligned with any selected one (3A) of said secondary sections, said main and secondary sections and said rotary elbow having identical inside diameters, said rotary elbow constituting part of a rotatable pipe closure element (7) comprising a ring (8) coaxial with said rotary coupling (5) through which said other end (4B) of said rotary elbow discharges, said ring (8) at all times in fluid-tight contact with the radially innermost edges of said secondary sections so as to close off in a fluid-tight manner said secondary sections other than said selected secondary section.

2. A fluid transfer valve according to claim 1, wherein the secondary sections (3) are coplanar and circumferentially spaced in an angular direction about the axis (X—X) of the main section.

3. A fluid transfer valve according to claim 1, wherein the pipe closure element (7) is disposed in a housing (10) by means of which the main and secondary sections are attached to each other.

4. A fluid transfer valve according to claim 1, wherein the radius of the ring (8) is between three and five times the inside radius of the main and secondary sections.

5. A fluid transfer valve according to claim 1, wherein the radius of the ring (8) is between one and one and one-half times the average radius of curvature of the rotary elbow.

6. A fluid transfer valve according to claim 1, wherein the pipe closure element (7) is rotated by a rotary motor (11) coaxial with the main section and in line therewith beyond the elbow.

7. A fluid transfer valve according to claim 6, wherein the rotary motor (11) is powered by hydraulic pressure.

8. A fluid transfer valve according to claim 6, wherein the rotary motor (11) is powered by pneumatic pressure.

9. A fluid transfer valve according to claim 6, wherein the rotary motor (11) is powered by electricity.

10. A fluid transfer valve according to claim 1, wherein the pipe closure element (7) includes a plurality of locking members (14) equal in number to the number of secondary sections, and the housing (10) includes a complementary locking means (15-16) adapted to functionally cooperate with one of the locking members (14) when the rotary elbow is aligned with one of the secondary sections.

11. A fluid transfer valve according to claim 10, wherein the complementary locking means includes a retractable pin (16), and the locking members comprise ports (14) adapted to receive said pin (16) in its extended position.

12. A fluid transfer valve according to claim 11, wherein the ports (14) reside on a transverse plate (13) fastened to the ring (18), and the pin (16) is disposed parallel to the axis of the main section.

13. A fluid transfer valve according to claim 1, including a marker (17) on the pipe closure element (7) and, fastened to the plurality of secondary sections, a plurality of detectors (18), each detector associated with a secondary section, said detectors adapted to sense the marker when said other end (4B) of the rotary elbow (4) is aligned with one of the secondary sections.

14. A fluid transfer valve according to claim 13, wherein the marker comprises a protuberance (17), and the detectors comprise a plurality of proximity sensors (18).

15. A fluid transfer valve according to claim 1, including a second plurality of secondary sections (3') distributed angularly around the axis of the main section (2) and disposed at equal distances from and with equal inclinations to this axis, and a second pipe closure element (7') comprising a second rotary elbow (4') of which one end is connected by a second rotary coupling (5') to the main section and of which the other end is adapted to be aligned with any chosen one (3A') of the secondary sections of said second plurality thereof, and a second ring (8') that is always in fluid-tight contact with the radially innermost edges of the second plurality of secondary sections.

16. A fluid transfer valve according to claim 15 wherein the second pipe closure element (7') is disposed in a second housing (10') which is connected to the first housing (10) for functional cooperation of the first and second secondary sections.

* * * * *